No. 735,229. PATENTED AUG. 4, 1903.
J. E. ENYART.
HAY RICKER.
APPLICATION FILED NOV. 8, 1902.
NO MODEL. 2 SHEETS—SHEET 1.
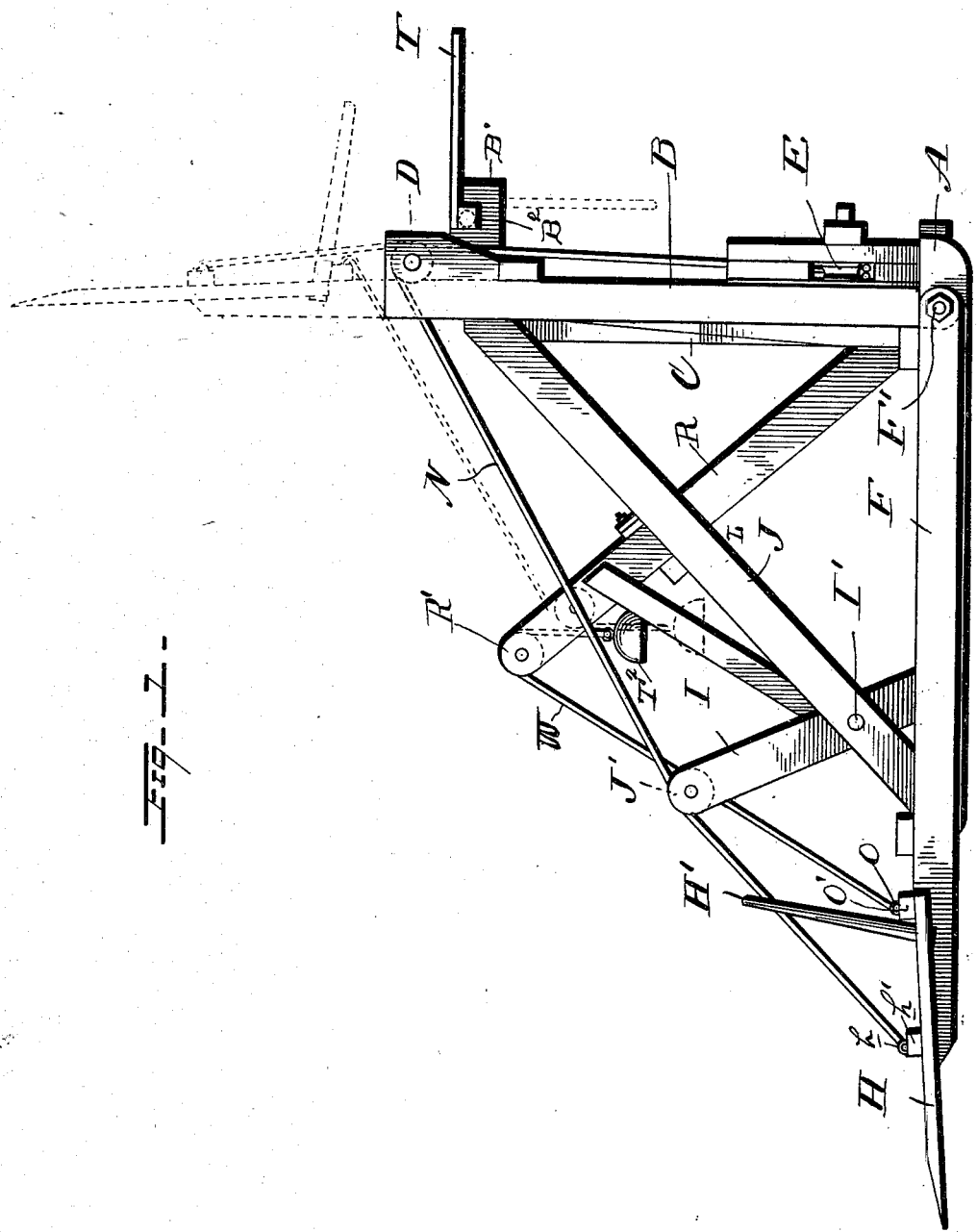

No. 735,229. PATENTED AUG. 4, 1903.
J. E. ENYART.
HAY RICKER.
APPLICATION FILED NOV. 8, 1902.
NO MODEL. 2 SHEETS—SHEET 2.
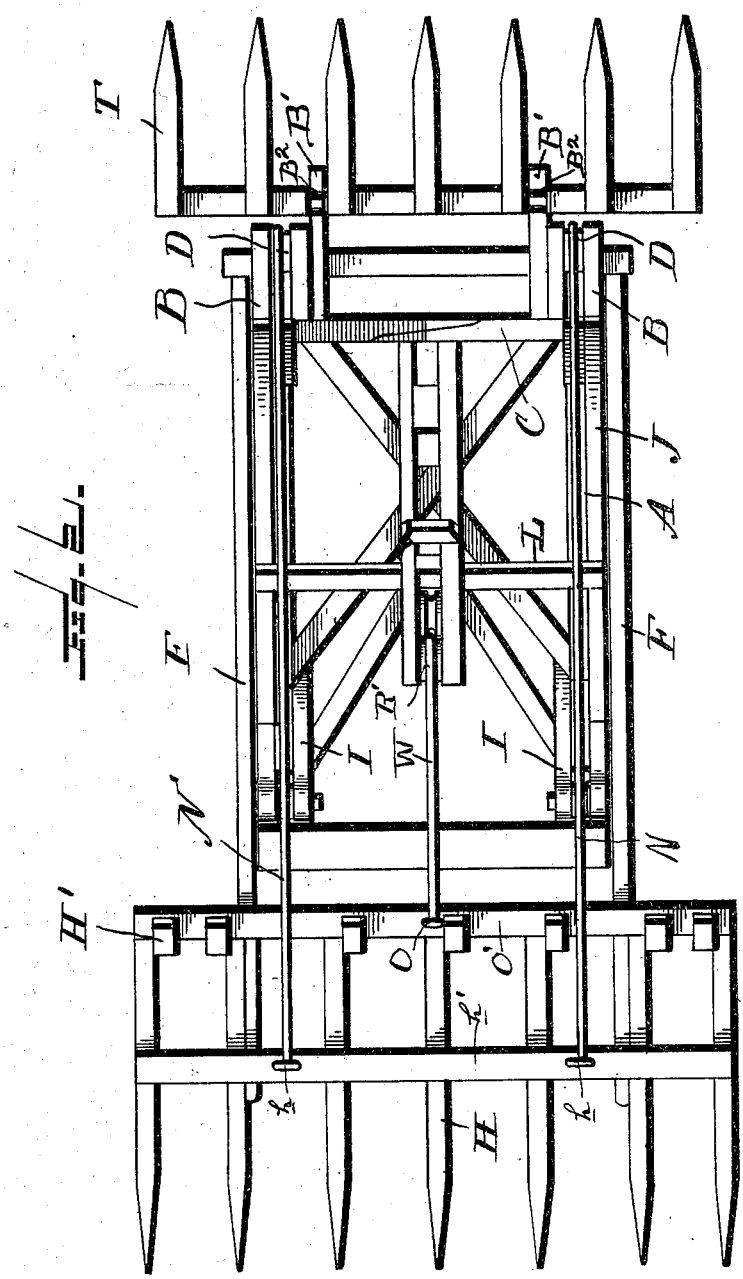

No. 735,229.

Patented August 4, 1903.

UNITED STATES PATENT OFFICE.

JAMES E. ENYART, OF McFALL, MISSOURI.

HAY-RICKER.

SPECIFICATION forming part of Letters Patent No. 735,229, dated August 4, 1903.

Application filed November 8, 1902. Serial No. 130,596. (No model.)

*To all whom it may concern:*

Be it known that I, JAMES E. ENYART, a citizen of the United States, residing at McFall, in the county of Gentry and State of Missouri, have invented certain new and useful Improvements in Hay-Rickers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in hay rickers or stackers, comprising a frame having suitable uprights, pulleys thereon with beams pivotally mounted upon the frame and carrying a hay-fork, and in the provision of diagonally-disposed beams having pulleys thereon, over which ropes pass for hoisting the fork, and also in the provision of a counterweight which is passed over a suitable pulley and is attached to the crosspiece of the fork, and in the provision of an apron on which the material being raised by the fork is deposited.

The invention consists, further, in various details of construction and combinations of parts, which will be hereinafter fully described and then specifically defined in the appended claim.

My invention is illustrated in the accompanying drawings, which, with the letters of reference marked thereon, form a part of this application, and in which—

Figure 1 is a side elevation of my improved ricker or hay-stacker, and Fig. 2 is a top plan view of Fig. 1.

Reference now being had to the details of the drawings by letter, A designates a base of the supporting-frame, from which rise the uprights B and provided with suitable braces C and horizontally-disposed bracket-arms B', recessed as at B². Journaled at the upper ends of the uprights B are pulleys D D, and pulleys E E are journaled near the lower ends of the uprights.

F F designate swinging beams, which are pivotally mounted at F' on a rod or bolt carried by the base portion of the frame. Fastened to the ends of said beams F is a rack or hay-fork H, having tines H', disposed at right angles to the tines upon which the hay rests.

J J designate diagonally-disposed braces fastened at their lower ends to the base of the frame and their upper ends to the uprights B, and I I designate beams which are bolted at I' to the diagonal braces J and have pulleys J' mounted in their upper forked ends. A cross-piece L is provided, which rests upon the braces J and serves to support the inclined pulley-carrying beam R. Ropes N and N' are secured to eyes $h$ on the crosspiece $h'$ of the rack or fork and pass over the pulleys D at the upper ends of the uprights B, thence pass underneath pulleys at the lower ends of the apparatus, and are connected to a whiffletree to which a horse may be attached. It will be observed that the upper ends of the beams I are so positioned that they will receive the ropes when the loading rack or fork is at its lowest limit and are out of the way of the swinging fork as it is raised to a vertical position. A rope W is fastened at one end to a counterbalance-weight $T^2$, passes over a pulley R' on beam R, and its other end is connected to an eye O on a crosspiece O' of the rack H. Mounted in said recesses B² is a cross-piece having laterally-projecting teeth T, forming a rack, and on which the hay is deposited from the fork as it is raised, and from which rack the hay may be distributed over the stack being formed.

From the foregoing it will be observed that by the use of an apparatus herein described, and illustrated in the drawings, a load of hay may be readily hoisted from the wagon or other machine direct to the rack and the stack quickly formed, the swinging fork being raised by horse-power, and when it is desired to form stacks at different locations the apparatus, which may be temporarily anchored in any particular place by means of stakes, may be easily moved.

Having thus fully described my invention, what I claim as new, and desire to secure by Letters Patent, is—

A hay ricker or stacker, comprising in combination with the framework having uprights B and suitable braces J, bracket-blocks secured to said uprights, pulleys mounted in said brackets, a rack T, horizontally-disposed bracket-arms having recesses in which said rack is mounted, the cross-piece L upon said braces J, the rack fastened to the ends of the beams F, the beams I bolted to said braces J, and pulleys J' mounted at the free ends of said beams I, a cross-piece h' connecting the tines of said rack, eyes carried by said cross-piece, and ropes N and N' secured to said eyes and passing over said pulleys, a cross-piece O' secured to the rear ends of the tines, and a centrally-disposed eye O mounted thereon, a rope W secured at one end to said eye O and passing over a pulley mounted upon said beam R, and a weight secured to its other end, as shown and described.

In testimony whereof I hereunto affix my signature in presence of two witnesses.

JAMES E. ENYART.

Witnesses:
F. HUMPHRY,
S. B. WILLIAMS.